Nov. 6, 1956 H. B. CANNON 2,769,545
APPARATUS FOR SEPARATING AND CONCENTRATING GRANULAR MIXTURES
Filed Nov. 17, 1954 2 Sheets-Sheet 1
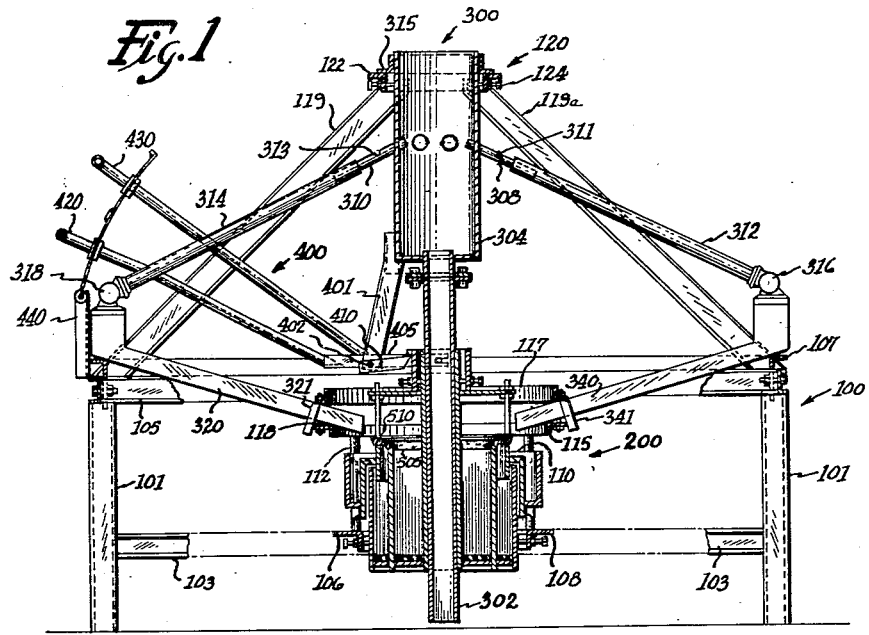
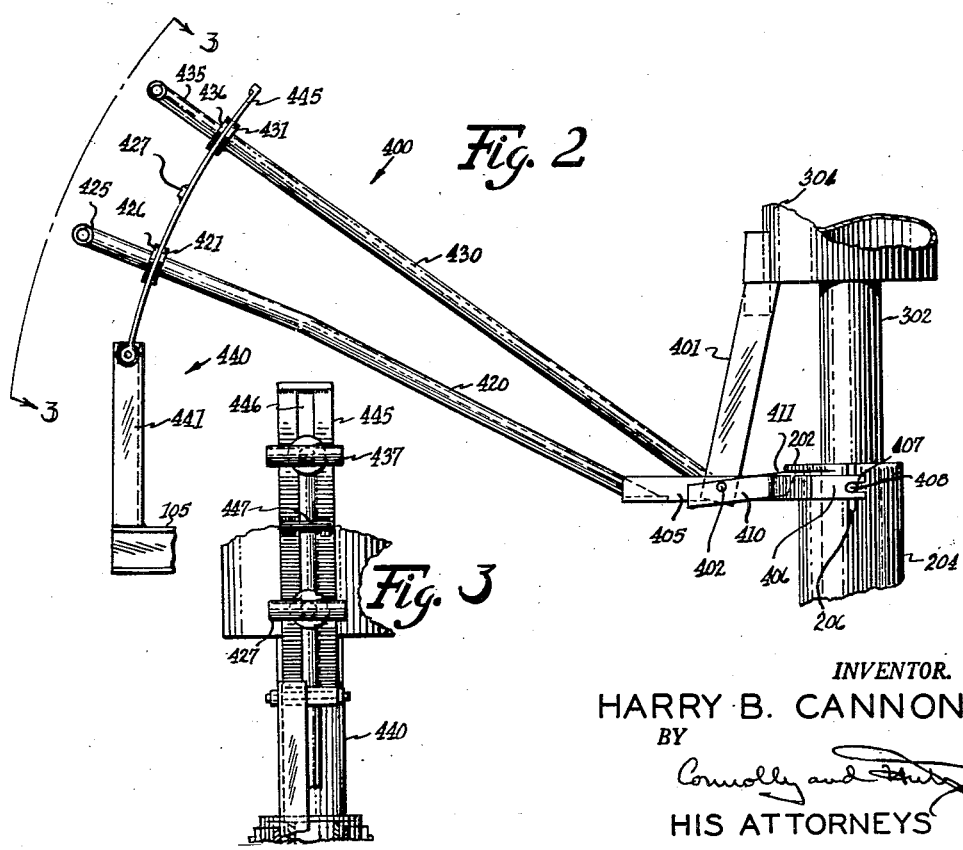
INVENTOR.
HARRY B. CANNON
BY
HIS ATTORNEYS Nov. 6, 1956 H. B. CANNON 2,769,545
APPARATUS FOR SEPARATING AND CONCENTRATING GRANULAR MIXTURES
Filed Nov. 17, 1954 2 Sheets-Sheet 2
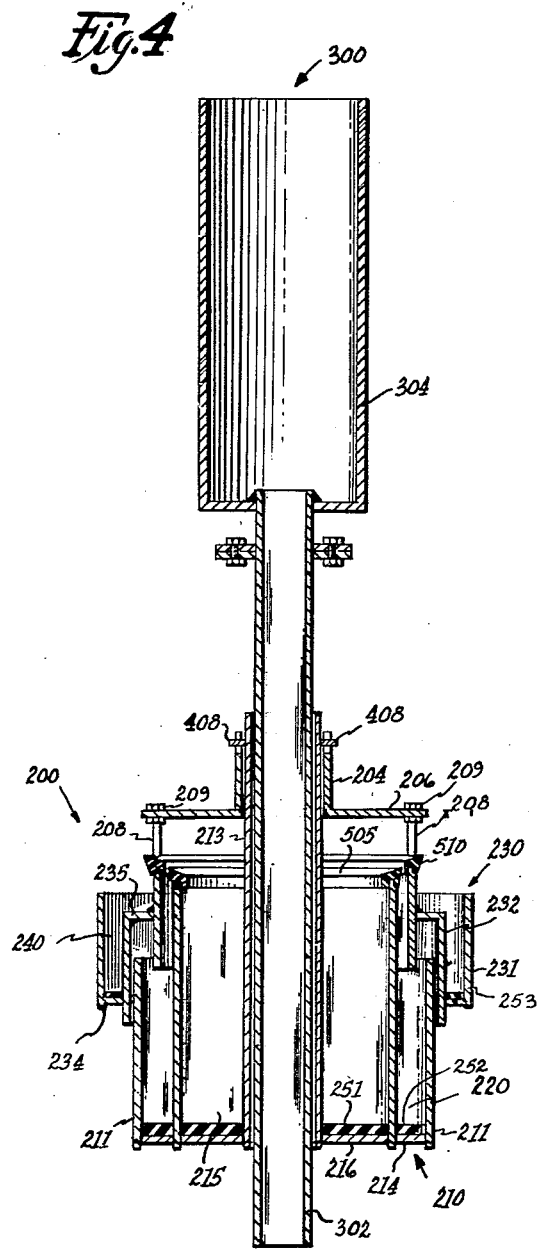
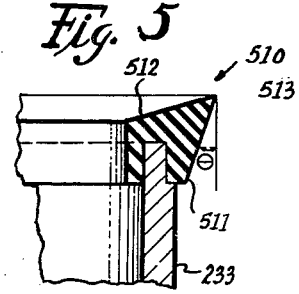
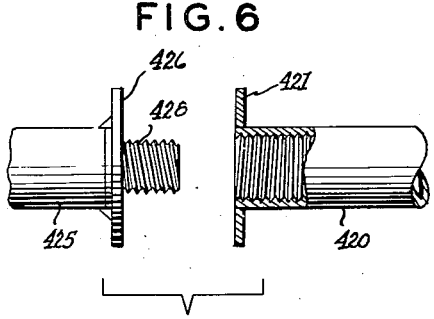
INVENTOR.
HARRY B. CANNON
BY
HIS ATTORNEYS United States Patent Office 2,769,545
Patented Nov. 6, 1956

2,769,545

APPARATUS FOR SEPARATING AND CONCENTRATING GRANULAR MIXTURES

Harry B. Cannon, Lakeland, Fla.

Application November 17, 1954, Serial No. 469,414

8 Claims. (Cl. 209—493)

This invention relates to an improved apparatus for separating granular mixtures into constituent components by gravity induced stratification. More particularly, this invention is concerned with an improved pinched sluice-type separator for stratifying liquid slurries of ores into separated strata, one of which contains the major portion of a valuable mineral, another of which contains very little, if any, valuable mineral, and a third of which contains sufficient valuable mineral to warrant reprocessing. Specifically, the instant invention comprises an improvement over the separator arrangement set forth in my copending application, S. N. 297,952, filed July 9, 1952.

As will be more readily appreciated by reference to said copending application, the novel slurry separator therein described has been found exceedingly effective for concentrating valuable minerals such as ilmenite, rutile, zircon, cassiterite and the like from heavy mineral-bearing sands. The new arrangement therein disclosed employs a plurality of inclined pinched sluices, each having a relatively broad inlet mouth and a relatively narrow outlet between converging sidewalls and through which ore in the form of a liquid slurry is flowed to become stratified according to density. In addition, slurry splitter means are associated with the pinched sluices beyond the outlets for the purpose of positively splitting the stratified slurry as it emerges from the sluice into a zone of free fall beyond the outlets whereby the several portions of the slurry comprising the concentrates, the middlings and the tailings are wholly separated. A particularly advantageous feature of the aforesaid invention is the grouping of the plurality of pinched sluice separator units into circular array to form a composite separator of frusto-conical configuration in which the individual pinched sluices appear as spokes of a wheel, and the slurry splitter means is a centrally located funnel-shaped member.

This form of separator has proven to be most effective in practice and to have substantially doubled the output capacity of a small size installation over heretofore known arrangements with a further large increase in the efficiency of recovery. However, the improved separator has not exhibited the desired degree of durability, and in effect, has not been as rugged as is required for the almost continuous operation experienced in the industry. As a result, it has been necessary to frequently replace and repair various component parts of these separators. In addition, the arrangement for moving the splitter elements in the free fall zone of the separators has proven unwieldly for the delicate adjustments required.

Accordingly, it is a prime object of the instant invention to provide an improved slurry separator of the multiple pinched-sluice type. Another object of the present invention is the provision of a separator of multiple pinched sluice units which is very rugged and durable. Yet another object of the instant invention is the provision of improved control means for adjusting the position of multiple slurry splitter elements. A further object of the invention is the provision of an improved slurry splitter element for frusto-conical slurry separators. Yet a further object of the invention is an improved wear resistant catch basin arrangement for collecting separated portions of slurry mixtures. Other and distinct objects will become apparent from the description and claims which follow.

The invention will be better understood by reference to the following more specific description and claims in connection with the annexed drawings, in which:

Fig. 1 is a side elevation view, partly in section, of the improved slurry separator with only two of the pinched sluice units illustrated for the sake of clarity, Fig. 2 is an enlarged side elevation view of the control arrangement for the slurry splitter members of the invention, Fig. 3 is an end view of the control mechanism of Fig. 2, Fig. 4 is an enlarged view illustrating the improved slurry collecting arrangement according to the invention, Fig. 5 is an enlarged fragmentary view illustrating a wear resistant splitter lip construction for the collecting structure of Fig. 4, and Fig. 6 is a fragmentary view, partly in section, of the splitter control mechanism of Fig. 2.

Referring now to Fig. 1 of the drawings illustrating the improvement according to the invention, it will be seen that the instant arrangement is analogous to that more particularly described in applicant's said copending application in that it comprises an independent, self-sustaining support arrangement 100 for mounting a plurality of inclined pinched sluice units, specifically of the type particularly described and claimed in said copending application. These units are grouped in an annular array having the general configuration of a frustrum of a cone about a collecting structure 200. For the sake of clarity, only two diametrically opposed pinched sluices, 320 and 340, have been illustrated in the figure, but it will be readily understood by those skilled in the art that there are a plurality of the same positioned adjacent one another about the unit 200 and supported on structure 100.

In accordance with the instant invention, the supporting structure 100 is formed to be of the suspension type, and for this purpose, comprises a plurality of upstanding radially spaced leg elements 101 connected, as by welding, to horizontal beam members 105. Although only two such legs are shown in the figure, it will be readily understood that three or four may be provided to form a triangular or quadrangular base. The respective legs 101 are reinforced as by means of cross bars 103 extending between the legs and connected thereto, as by welding, and which bars support a pair of spaced L-shaped beams 106 and 108. Beams 106 and 108 in turn support a plurality of upstanding legs 110 and 112, only two being shown in the drawings but it being understood that three or four may be employed. Legs 110 and 112 are integrally connected to an L-shaped ring or annular support structure 115 forming a rest for the inclined nose portions of the pinched sluices. Support ring 115 is adapted to cooperate with an overlying, identically shaped clamping ring 117 which is arranged to be interchangeably associated with ring 115 by means of removable threaded bolt members 118. The arrangement is such that the upper ring 117 can be clamped over the upper surfaces of the inclined sluices 320, 340, etc., to frictionally hold the sluices in a predetermined, fixed position on ring 115. To assist clamping ring 117, the respective pinched-sluice units are provided with guide flanges 321, 341 for abutting ring 115 and holding the sluice units at a predetermined radial point from the center of the frusto-conical array.

The main support beams 105 mount a ring member 107 of L-shaped cross section which is bolted thereto through depending slotted plates permitting several height adjustments. Ring member 107 serves as an outer rest for the loading or inlet end of the pinched sluices 320, 340, etc. The beams 105 carry a plurality of upwardly extending inclined bracket members 119 and 119a. Only two of the bracket members are illustrated in the drawings but it will be readily understood that three or four or more may be provided. The bracket members 118, 119, etc., are in turn integrally joined with a further annular support structure 120 comprising a ring member 122 of L cross section having a plurality of radially directed holes 123 for receiving a plurality of adjustable centering screws 124 for a purpose hereinafter apparent. The upper face of ring member 122 is adapted to receive and frictionally support an external flange or annular bearing member 315 on a slurry distributing structure 300. The slurry distributor 300 comprises a riser pipe 302 integrally connected with an enlarged diameter surge reservoir 304 provided with a plurality of discharge openings 306. The openings 306 are adapted to receive short lengths of inclined piping, 308 and 310, which may be affixed in the holes by welding or the like and which serve as distributor nozzles for directing the liquid slurry from out of reservoir 304. Nozzles 308 and 310 in turn telescope into respective elongated pipe or rubber hose members 312 and 314 extending from the loading or inlet ends of the respective pinched-sluices 320, 340. In a preferred form of the invention, the hose members are integrally connected with molded rubber elbows 316 and 318 which direct the slurry delivered through the hoses into the outer ends of the respective sluice units. The positioning of the sluice units and interchange of delivery conduits is facilitated by the telescoping connection between the nozzles and the hose while danger of undesired siphoning and clogging in the lines is avoided by the provision of air holes 311 and 313 in the respective delivery nozzles. With this arrangement, a continuous, constant rate of delivery may be readily obtained by adjustment of the pressure directing the slurry up riser 302.

The innovation according to the invention contemplates a further improvement in providing a simplified, slurry collecting, splitting and control structure. As will be seen by reference to Figs. 1 and 2, surge tank or reservoir 304 fixedly supports a depending bracket 401 having at its lower terminal end a pivotally mounted pin or arbor 402 forming a fulcrum for a pair of rockable control elements 405 and 410. Control elements 405 and 410 are adapted to be independently actuated by means of a pair of control levers, 420 and 430, cooperatively associated with a guide and support bracket arrangement 440 carried by support ring 107 at one side of the separator structure. The control elements 405 and 410 are adapted to selectively and independently adjust the relative vertical positions of a pair of splitter elements 505 and 510 associated with the collecting structure 200 in a manner hereinafter more fully explained.

The structure of the splitter control mechanism will be more readily understood by reference to Figs. 2 and 3 of the drawings illustrating the same in enlarged views. As shown in Fig. 2, the respective control elements 405 and 410 are mounted to straddle bracket 401, control element 410 being fixedly connected to arbor 402 for rotation therewith and control element 405 having bearing bosses (not illustrated) pivotally suspending element 405 about pin 402 for independent pivotal movement. Element 405 is connected at its lefthand end with the tubular control rod 420, and at its other end carries a bifurcated fork or tong 406 having recessed grooves 407 for receiving radially projecting guide pins 408 integrally carried by an elongated sleeve 213 of the collecting and slurry splitting structures 200. Control element 410, on the other hand, includes an elongated nose portion 411 which is adapted to engage a radially directed lip or collar 202 on a sleeve member 204 concentric with sleeve 213 and forming part of the collecting and slurry splitting structures to be described more fully hereinafter. Sleeve 204 includes a vertically directed elongated slot 206 providing a lost motion connection between the pins 408 and the sleeve whereby movement of the respective control elements 405 and 410 may independently adjust sleeve 204 and sleeve 213. Tubular control rod 430 is integrally connected with the arbor or pivot rod 402, as by welding, in such manner that arcuate movement of rod 430 will serve to pivot control element 410 via rod 402.

Control rods 420 and 430 extend to a guide and support bracket structure 440 comprising an upstanding leg 441 integrally connected with support ring 107 and the enlarged base 105 and carrying a flexible slotted guide plate 445. Plate 445 is of rectangular extent, as will be more readily appreciated by reference to Fig. 3, and includes an elongated slot 446 which is separated into two independent guiding areas by a cross bar or blocking member 447. The respective control rods 420 and 430 include bearing bosses or flanges 421 and 431, respectively, which are adapted to bear against the underside of plate 445 in cooperation with detachable handles 425 and 435 carrying bearing bosses 426 and 436, respectively, and which serve to clamp control rods 420 and 430 in a given spatial position with respect to the stationary guide plate 445. As shown in Fig. 3, handles 425 and 435 comprise tubular members mounting transverse grip elements 427 and 437, respectively, providing a convenient means for manually grasping the control structures to adjust the position of the splitter elements of the collecting structure, as will be more fully understood hereinafter. The tubular handles 425 and 435, as well as the tubular control rods 420 and 430, are identically constructed and each include an arrangement as shown in Fig. 6.

As therein illustrated, handle 425 is provided at its terminal end opposite bearing flange 426 with a threaded extension or nose 428. Nose 428 is adapted to cooperate with internal threads in the tubular control rod 420 in such manner that rotation of handle 425 relative to control rod 420 will move the handle towards or away from the control rod whereby the respective flanges 421 and 426 are either brought into proximity to clamp the interposed guide plate 445 and thereby frictionally lock control rod 420 in a fixed position, or to move further apart and release control rod 420 for arcuate adjustment in slot 446 of plate 445. It will be readily understood that this simplified and inexpensive structural arrangement simultaneously provides a readily accessible means for adjusting the vertical position of the connected splitter elements in a stepless manner and for securely locking the elements via the control rod in a predetermined position. The improved control afforded by this novel arrangement will be better understood, however, by reference to Fig. 4 of the drawings illustrating the modified arrangement of the combined collecting and slurry splitter structure according to the invention.

As shown in the figure, collecting structure 200 is positioned about riser pipe 302 of the slurry distributor unit 300 and includes a pair of open ended annular bucket members 210 and 230. Bucket 210 includes vertically directed concentric circular walls 211, 212 and 213 cooperating with annular base plate members 214 and 216 to form a first inner collecting chamber 215 and a second outer collecting chamber 220. The annular base plates 214 and 216 are joined to the respective cylindrical walls by any suitable means, as for example, by welding, to provide an integrated structure. The bucket member 230 also is formed of three concentric sleeve members 231, 232 and 233 which are integrally connected together by means of annular base plates 234 and 235 to form a stepped collecting chamber 240. It will be readily understood upon inspection of the figure that the bucket member 210 providing the adjacent collecting chambers 215 and 220 is wholly independent of bucket member 230 providing the annular collecting chamber 240, but that the respective bucket structures are telescoped one upon the other and upon the centrally located riser 302 to provide a very compact slurry collecting arrangement. Although not illustrated in the figure, it will be readily understood by those skilled in the art that the annular floor members or base plates 214, 216 and 234 of the respective collecting chambers are provided with drop-out or outlet conduit means for discharging the collected slurry materials from the respective chambers. Preferably, the floors of the collecting chambers are lined with rubber matting, 217, 219 and 237, respectively.

A particular feature of the instant invention is the utilization of the slurry collecting structure to support a pair of relatively movable slurry splitter elements 505 and 510. Slurry splitter element 510 comprises an annular rubber lip seated on the upper edge of sleeve wall 233 of the bucket 230 and splitter element 505 comprises a similar structure seated on the upper edge of wall 212 of bucket 210. The arrangement is such that telescoping movement of bucket 210 relative to bucket 230, or vice-versa, serves to change the relative positions of the splitter elements 505 and 510 with respect to each other and thereby with respect to the effluent discharged from the surrounding sluices 320, 340, etc., as will be better appreciated by reference to Fig. 1 of the drawings.

This relative telescoping movement is readily provided for according to the instant invention by utilizing the central sleeve wall 213 of bucket 210 as a control connection. For this purpose, sleeve 213 is made relatively long to extend vertically upwardly into proximity with the control mechanism 400, see Fig. 1, and at its upper end is provided with radially projecting pegs or pins 408 extending through the elongated slots 206 in the concentric sleeve 204. As heretofore indicated, pins 480 are adapted to be gripped by the bifurcated ends of control element 405 whereby movement of control rod 430 will move sleeve 213 and therewith splitter 505.

The sleeve 204 in turn integrally carries an annular plate or flange member 206 which is adapted to be removably connected, via nuts 209, with a plurality of depending bolt members 208 extending from sleeve wall 233 of bucket 230. Since sleeve wall 233 supports the splitter element 510, movement of sleeve 204 and wall 233 will change the relative position of splitter element 510 with respect to splitter element 505 and the effluent from the surrounding sluices. The relative range of movement of the respective splitter elements can be readily and easily changed by adjusting the position of the bolts 208 relative to plate 206, via nuts 209.

From the above description, it will be readily appreciated that the respective relative movements of the slurry splitter elements 505 and 510 are directly and immediately controlled by the relative arcuate positions of control elements 405 and 410. It will further be understood that control elements 405 and 410 can be easily locked in a set position via the manual control structure 400.

Another important feature of the present invention is the formation of the splitter elements 505 and 510 from a relatively soft rubber, such as the automotove tire carcass types, by extrusion. This form of splitter element has been found to provide a useful operational life which is more than treble that obtainable with metallic splitter elements. A further important feature of the invention is the configuration of the splitter element, per se, to present inclined surface walls 511 and 512 angularly related with respect to the vertical and horizontal, respectively, by an angle $\theta$ of approximately 20 degrees. This presents the edge of the splitter to the effluent stream at an angle of about 45°. With this particular constructional configuration, the splitter elements are adapted to move vertically with respect to the effluent stream discharged from the outlet edges of the pinched sluice units for a relatively lengthy extent without deleteriously affecting the separation action. A particular feature of the specific inclined wall surface arrangement for the splitter elements is the elimination of any tendency to cause turbulence at the splitter edge whereby rapid and highly efficient separation action is obtainable. In this respect, cognizance should be taken of the fact that very slight changes in the position of the splitter elements relative to the effluent discharged from the frusto-conical array will often determine whether the separation proceeds effectively or not.

It will further be appreciated from the above detailed description that the instant improved slurry separator arrangement provides a construction which is simply and easily supported by a minimum of component parts. In this respect, examination of Fig. 1 of the drawings will show that the surge tank and riser pipe of the slurry supply or distributor system 300 is independently suspended by support ring 120, the distributor being centrally and adjustably mounted with respect thereto by the clamping screws 124. At the same time, it will be noted that the control structure 400 and therewith the slurry collecting structure 200 and its integral slurry splitter arrangement 505, 510 also are supported from ring 120 via bracket 401, and the connection between the rockable control elements 405, 410 and the respective sleeve members 204 and 213. This unique suspension support simplifies installation and replacement operations and implements movement of the entire separator arrangement as an integrated unit, as for example, by means of a traveling crane coupled to support ring 120 for lifting the support ring and therewith support structure 100 as a unitary structure. The effect of this arrangement will be readily understood by those skilled in the art as being of great advantage in those installations utilizing a plurality of isolated granular slurry repositories, as for example, as are frequently provided in the art by utilizing natural quarries, subterranean pits, and the like as storage basins for raw minerals.

Yet a further and outstanding feature of the present invention is the simplification of the construction of the annular collecting bucket members 210 and 230. As will be readily understood by those skilled in the art, the slurry splitter elements 505 and 510 are adapted to separate the effluent as it is discharged from the apex of the triangular pinched sluice members 320, 340, etc., into an annular discharge zone of free fall and to collect the separated fractions, as concentrates in the bucket 230 and middlings and tailings in the respective chambers 220 and 215 of bucket 210. Since the operation is a continuous one, it will be apparent that means must be provided for redirecting the separated fractions from the relatively limited volume of the respective collecting chambers. Prior to the present invention, it was common practice to form collecting members with inclined floors serving to gravity feed the collected material to an outlet at the lowest point. As will be readily understood, this required complicated and expensive techniques in forming the collecting members. It has been discovered, however, that such innovation is unnecessary and indeed undesirable. The particular arrangement illustrated herein obtains the same desirable constant delivery rate (or through-put) while maintaining the floor surfaces 214, 216 and 234 level and applying a cover matting of relatively soft rubber, preferably of the automotive tire carcass type. This will be more readily understood by reference to Fig. 4 of the drawings in which the annular bucket members are illustrated as including rubber floor matting 251, 252 and 253. It will further be understood that suitable drop-out means such as an opening (not shown) is provided in the floor of each of the chambers.

With this arrangement the effluent discharged from the pinched sluice units into the respective collecting chambers of the respective bucket members serves to build up a sloping pile of granular material, having its greatest height 180° from the drop-out openings and gradually tapering along an annular path to the opening itself. In practice, it has been observed that this material, whether valuable mineral such as the concentrates collected in bucket 230, or a mixture of valuable mineral and gangue material as is collected in chamber 215, reaches a maximum height which is under one-half the height of the sidewalls forming the bucket chambers. For substantially all installations, the height of the immobilized collected material exhibits a minimum slope of at least 20° stretching from its high point to the drop-out opening and which serves to rapidly direct additional collected material through the openings. A unique feature of this arrangement is the fact that the material which remains in the collecting chambers serves as a wear resistant floor which extends the life of the bucket members many fold. Contamination as by atmospheric conditions, acidity of the slurry, etc., of the bucket structure, per se, is minimized by provision of the rubber matting 251, 252, 253. In most instances it is preferred that the concentrates collecting chamber include two drop openings, spaced 180° apart, whereby the collected slurry fraction need travel a maximum distance of only 90° to the drop-out point.

As many apparently widely different embodiments of this invention may be made without departing from the spirit and scope hereof, it is to be understood that this invention is not to be limited, except as in the appended claims.

What is claimed is:

1. In a separating unit for separating valuable minerals from a slurry containing mineral-bearing ores including gangue materials, the combination of a vertically extending conduit for delivering a slurry vertically upwardly, a separating battery including a plurality of pinched-slice type troughs arranged in an annular array about said conduit and each having raised converging sidewalls and a sloping floor surface to thereby provide the separating battery with the shape of an inverted frustrum of a cone said separating unit having supporting means for mounting the said battery and said conduit in an upright position, distributing means connected to said conduit and positioned to cooperate with the said separating battery for delivering the slurry thereto, a plurality of concentric slurry-splitting members surrounding said conduit, each member including a tubular depending sleeve portion concentrically mounted about said tubular conduit and including at its vertical edge a circular slurry splitter element formed of rubber and having converging wall surfaces defining a splitter edge directed radially outwardly and upwardly at an angle of approximately 45° from said sleeve, and collecting means associated with each said sleeve and splitter element for independently receiving fractions of the minerals and gangued materials as they are separated from said mineral-bearing ores by said splitter elements upon discharge of said slurry from said sluices into a zone of free fall.

2. In a separating unit for separating valuable minerals from mineral-bearing ores including gangue materials, the combination of a vertically extending conduit, a separating battery surrounding said conduit and including a plurality of inclined pinched-sluice type troughs arranged in an annular array about said conduit, distributing means connected to said conduit and positioned to cooperate with the said separating battery for delivering the slurry thereto, a plurality of slurry-splitting members surrounding said conduit, each member including a tubular depending sleeve portion and an integral angularly extending peripheral splitter lip positioned at a distance from the apex of said sluices in a zone of free fall, means associated with each splitter element for collecting the slurry in separated fractions from the splitter elements, and suspension means for supporting the said battery in an upright position, said suspension means including structure for mounting the splitter elements and collecting means in a predetermined but variable position relative to the discharging slurry.

3. In a separating unit for separating valuable minerals from a slurry containing mineral-bearing ores including gangue materials, the combination of a vertically extending delivery conduit, a separating battery concentrically mounted about said conduit including a plurality of pinched-sluice type troughs arranged in an annular array about said conduit to form an annular slurry discharge zone, distributing means including independent feed pipes connected to said tubular conduit and positioned to cooperate with the respective troughs to deliver the slurry thereto, a plurality of slurry-splitting members surrounding said tubular conduit, each said member including a tubular depending sleeve portion and an integral angularly extending peripheral splitter lip positioned in the said annular slurry discharge zone, slurry collecting means integrally associated with said splitter elements including a plurality of relatively telescopingly movable bucket members for collecting separated fractions of the slurry discharged into said zone, and suspension means for supporting said battery in an upright position including structure removably seating said distributor means.

4. In a separating unit for separating valuable minerals from a slurry containing mineral-bearing ores including gangue materials, the combination of a vertically extending delivery conduit, a separating battery concentrically mounted about said conduit including a plurality of pinched-sluice type troughs arranged in an annular array about said conduit to form an annular slurry discharge zone, distributing means including independent feed pipes connected to said tubular conduit and positioned to cooperate with the respective troughs to deliver the slurry thereto, a plurality of slurry-splitting members surrounding said tubular conduit, each said member including a tubular depending sleeve portion and an integral angularly extending peripheral splitter lip positioned in the said annular slurry discharge zone, slurry collecting means integrally associated with said splitter elements including a plurality of relatively telescopingly movable bucket members for collecting separated fraction of the slurry discharged into said zone, suspension means for supporting said battery in an upright position including structure for removably seating said distributor means, and control means supported from said delivery conduit and including a pair of pivotally mounted control levers respectively connected to the said slurry-splitting members, an elongated guide bracket having an elongated slot, manual control rods associated with said control members and projecting through said slot of said bracket, and means associated with each said control rod for frictionally locking said rod to said bracket.

5. In a separating unit for separating valuable minerals from mineral-bearing ores including gangue materials, the combination of a vertically extending conduit, a separating battery surrounding said conduit and including a plurality of inclined pinched-sluice type troughs arranged in an annular array about said conduit, each said sluice terminating at a distance from the others to thereby form the configuration of an inverted frustrum of a cone, distributing means connected to said conduit and positioned to cooperate with the said separating battery for delivering the slurry thereto, a plurality of slurry-splitting members surrounding said conduit, each member including a tubular depending sleeve portion and an integral angularly extending peripheral splitter lip positioned at a distance from the apex of said sluices in a zone of free fall, means associated with each splitter element for collecting the slurry in separated fractions from the splitter elements, suspension means for supporting the said battery in an upright position, including structure for suspendingly mounting the splitter elements and collecting means in a predetermined but variable position relative to the discharging slurry, and control means supported from said delivery conduit and including a pair of pivotally mounted control levers respectively connected to the said slurry-splitting members, an elongated guide bracket having an elongated slot, manual control rods associated with said control members and projecting through said slot of said bracket, and means associated with each said control rod for frictionally locking said rod to said bracket.

6. A separating unit as set forth in claim 1 in which said slurry splitter members and said collecting means are formed as an integrated structure, said collecting means further comprising concentrically mounted annular bucket members, and means associated with said suspension supporting means for suspending said delivery conduit, said splitter members and said collecting means from a common point.

7. A separating unit as set forth in claim 1 including a bracket suspended from said delivery conduit, a pair of pivotal control elements supported by said bracket, means connecting respective ones of said control elements to respective ones of said plurality of slurry-splitting members, a control rod connected with each said control element, a guide bracket including an elongated slot positioned over said control rod, and means carried by each said control rod for frictionally locking it in predetermined positions in said slot whereby the relative position of said slurry-splitting members are determined with respect to said slurry discharge zone.

8. A separating unit as set forth in claim 6 in which said means for locking said control rods in said slot comprise a movable handle member associated with each said rod, a flange carried by said handle and positioned to overlie at least a portion of said bracket on one face thereof, a second flange associated with each said control rod on the other side of said bracket and coupling means connecting each said handle with each said control rod for optionally moving said flange members into frictional engagement with said bracket.

No references cited.